3,005,701
METHOD OF MAKING MELTING STOCK BY DIRECT REDUCTION

John E. Eberhardt, Bethlehem, Pa., assignor to Bethlehem Steel Company, a corporation of Pennsylvania
No Drawing. Filed Oct. 15, 1957, Ser. No. 690,207
7 Claims. (Cl. 75—34)

This invention concerns a method of making metallic iron compacts by the direct reduction of iron ore, said compacts being suitable for melting in an open hearth or electric furnace.

The iron and steel industry has long sought a method of making suitable melting stock directly from iron ore, thereby avoiding the necessity of using a blast furnace. Numerous methods for directly reducing iron ore have been devised, and a few have succeeded in producing a sponge iron which is suitable for certain uses, such as the powder metallurgy industry. However, no successful commercial direct reduction process has yet been devised which produces reduced iron compacts in a quality and form suitable for melting in an open hearth or electric furnace.

An object of this invention, therefore, is a direct method of converting iron ore to metallic iron in a form, and of a quality, suitable for melting in an open hearth or electric furnace. In this application, the terms sponge iron, iron powder, and metallic iron are synonymous.

Where low temperatures are used in directly reducing iron ore, the resulting metallic iron sponge or powder is usually pyrophoric in nature, making it difficult to handle.

Therefore, another object of this invention is a method of converting pyrophoric iron powder into a non-pyrophoric compact suitable for melting in an open hearth or electric furnace.

The method of this invention for converting iron ore to metallic iron compacts suitable for melting broadly comprises four steps or operations: (1) Reduction of the iron ore to sponge iron, (2) compacting the sponge iron, (3) heating the compacts to a relatively high temperature, and (4) cooling the compacts to room temperature.

Although any low temperature reduction method may be utilized, the preferred reduction step is a process which employs low temperatures, high pressures and a fluidized bed technique, with the reducing medium preferably being hydrogen. The finely divided ore is suspended in a rising column of reducing gas, resulting in excellent gas-solids contact and rapid reduction. Low temperatures are a necessity where fluidized beds are utilized, since at high temperatures the ore sinters and agglomerates, and prevents fluidization.

Therefore, the reduction temperature must be below the sintering temperature of the ore, which varies somewhat with the type of ore, and still must be high enough to insure a rapid rate of reduction. A desirable reduction temperature range is 700–1100° F. High pressures are desirable, since they permit the flow of large quantities of reducing gas in a short period of time, thereby increasing the rate of reduction. A pressure range of 200–600 p.s.i. has proved to be very successful.

Although hydrogen is preferred as the reducing medium, other reducing gases such as carbon monoxide may be employed in this process.

The sponge iron which comes from the reducer is not suitable for melting stock for two reasons, first, because it is highly pyrophoric, that is, it spontaneously oxidizes and generates heat when exposed to air or moisture, and second, because it is in a loose, powdery, low density form entirely unsuited for use in the open hearth or electric furnace. Therefore, the sponge iron must be stabilized (rendered non-pyrophoric) and compacted before it is suitable for melting.

Pyrophoric iron is stabilized by heating it to at least 1450° F. When the iron is in a powdered form it begins to agglomerate and stick together at 1450° F. If heated in a rotary kiln, the powder quickly agglomerates into a cake on the surface of the kiln and ruins the heating process. Heating a stationary mass of powder is impractical because of the poor heat transfer characteristics of such a bed. However, when the iron is in a compacted form these difficulties do not arise. Although some incipient fusion takes place in the compacts at 1450° F., their bulk, shape and size prevent their sticking together, and they can be stabilized without undergoing the same difficulties attendant upon stabilizing iron in the powdered form.

It therefore follows that the compacting operation should precede the stabilizing step, and does so in the process of this invention.

Since the sponge iron from the reducer is pyrophoric, it must be maintained in a non-oxidizing atmosphere until stabilization and cooling have taken place.

From the reducer, the sponge iron passes thru a protective atmosphere to the compacting operation, which may consist of smooth or pocketed rolls, presses, or any other desired form of compacting apparatus, so long as a non-oxidizing atmosphere is maintained. The sponge iron may be compacted hot or cold, and may be transported directly from the reducer to the compacter, or held in a storage bin to be compacted at some future time.

After the iron powder has been compacted, the pyrophoric compacts are transferred in a protective atmosphere to a heating apparatus, such as a rotary kiln, where they are heated (in a non-oxidizing atmosphere) to a temperature sufficiently high to effect stabilization, and preferably not so high as to effect any appreciable agglomerating or sticking together of the compacts. A small amount of sintering in the compacts can be tolerated and is, in fact, beneficial, if not excessive, since it results in a stronger compact.

The stabilizing temperature varies somewhat with the type of material, but generally must be in excess of 1450° F. to effect stabilization and may go as high as 2100 or 2200° F. before the compacts begin sticking together excessively. However, since increased temperatures mean increased costs, it is usually preferable to keep the temperature within the range of 1450–1700° F.

Following the heating operation, the compacts are cooled in a protective atmosphere to room temperature, at which point they are completely stable. Any suitable cooling means may be employed, and the cooling may take place naturally or by artificial means. Quenching the compacts in water has proved to be a successful method of cooling.

The procedure outlined above for compacting and stabilizing pyrophoric iron powder may be applied to pyrophoric iron powder from any source to convert it into non-pyrophoric compacts suitable for melting in an open hearth or electric furnace.

In a specific embodiment of this invention, finely divided iron ore is reduced by hydrogen at a temperature of 900° F. and a pressure of 250 pounds per square inch in a fluidized bed, resulting in iron powder which is 90% reduced. The reduced powder is passed directly thru a pair of compacting rolls at 800° F. The pyrophoric compacts are transferred to a rotary kiln, where they are heated to 1600° F. in a time period of about 20 minutes. The compacts are then cooled to room temperature, where they are completely stable. The entire operation, from reduction up to and including cooling, is conducted in a non-oxidizing atmosphere, the metallic iron never coming in contact with air until it has been fully stabilized and cooled.

I claim:

1. In a process for producing non-pyrophoric metallic iron compacts suitable for melting in an open hearth or electric furnace, the successive steps of reducing iron ore to metallic iron powder at a temperature between 700–1100° F., compacting said metallic iron powder, heating said compacts to a temperature of 1450–2200° F. to render the compacts non-pyrophoric and cooling said compacts to approximately room temperature, all of said steps being carried out in a non-oxidizing atmosphere.

2. The process of claim 1, in which the compacts are cooled to approximately room temperature by quenching in water.

3. In a process for producing non-pyrophoric metallic iron compacts suitable for melting in an open hearth or electric furnace, the successive steps of reducing iron ore to metallic iron powder by suspending finely divided iron ore in a rising column of reducing gas at a temperature between 700–1100° F. and at a pressure between 200–600 p.s.i., compacting said metallic iron powder, heating said compacts to a temperature of 1450–2200° F. to render the compacts non-pyrophoric and cooling said compacts to approximately room temperature, all of said steps being carried out in a non-oxidizing atmosphere.

4. The process of claim 3, in which the reducing gas is predominantly hydrogen.

5. The process of claim 3, in which the compacts are cooled by quenching in water.

6. In a method of making non-pyrophoric metallic iron compacts from pyrophoric metallic iron powder, the successive steps of compacting the pyrophoric iron powder, heating said compacts to a temperature of 1450–2200° F. to render the compacts non-pyrophoric and cooling said compacts to approximately room temperature, all of said steps being carried out in a non-oxidizing atmosphere.

7. The method of claim 6, in which the compacts are cooled to approximately room temperature by quenching in water.

References Cited in the file of this patent

UNITED STATES PATENTS

| | | |
|---|---|---|
| 1,453,057 | Williams | Apr. 24, 1923 |
| 2,252,697 | Brassert | Aug. 19, 1941 |
| 2,287,663 | Brassert | Jan. 23, 1942 |
| 2,382,601 | Boegehold et al. | Aug. 14, 1945 |
| 2,766,108 | Eberhardt | June 30, 1955 |

FOREIGN PATENTS

| | | |
|---|---|---|
| 590,392 | Great Britain | July 16, 1957 |